(12) United States Patent
Yamauchi (10) Patent No.: US 6,297,887 B1
(45) Date of Patent: *Oct. 2, 2001

(54) PRINTING APPARATUS, METHOD FOR CONTROLLING THE SAME, AND MEMORY MEDIUM

(75) Inventor: Mitsugu Yamauchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,452

(22) Filed: Jul. 7, 1998

(30) Foreign Application Priority Data

Jul. 9, 1997 (JP) .................................................. 9-184040
Jul. 30, 1997 (JP) .................................................. 9-204989

(51) Int. Cl.⁷ .................................................. G06F 15/00
(52) U.S. Cl. .................... 358/1.15; 358/1.13; 358/442; 358/468; 399/70
(58) Field of Search .......................... 358/1.1, 1.5, 1.13, 358/1.14, 1.15, 1.16, 442, 406, 409, 468, 1.11, 1.12; 399/50, 51, 60, 66, 67, 70

(56) References Cited

U.S. PATENT DOCUMENTS

| | | | |
|---|---|---|---|
| 5,490,237 | * | 2/1996 | Zimmermman et al. ............ 358/1.16 |
| 5,627,653 | * | 5/1997 | Nakazato ............................. 358/1.15 |
| 5,644,604 | * | 7/1997 | Larson ................................. 375/354 |
| 5,726,768 | * | 3/1998 | Ishikawa et al. .................... 358/442 |
| 5,812,154 | * | 9/1998 | Kuboki ..................................... 347/5 |
| 5,920,681 | * | 7/1999 | Hori ...................................... 358/1.5 |

* cited by examiner

Primary Examiner—Edward Coles
Assistant Examiner—Mark Wallerson
(74) Attorney, Agent, or Firm—Fitzpatrick, Cella, Harper & Scinto (57) ABSTRACT

A printer requests a host computer to transfer dummy data, counts a transfer time of the dummy data transferred in response to the request, and calculates a data transfer rate based on the counted transfer time. A time e required for reception of printing data for one page is calculated based on the data transfer rate f, and is compared with a rise time of a scanner. If f>e, the scanner is immediately started. If f≦e, the scanner is started with a timing such that the rotation speed of the scanner reaches a predetermined speed at the same time as completion of the reception of printing data. When reception of compressed data has been started, a printer controller transmits a scanning start command to a printer engine without awaiting completion of the reception of the compressed data. The printer engine starts to rotate the scanner in accordance with the scanning start command.

23 Claims, 6 Drawing Sheets

PRINTING APPARATUS, METHOD FOR CONTROLLING THE SAME, AND MEMORY MEDIUM

BACKGROUND OF THE INVENTION

1. Field of the Invention

The present invention relates to a printing apparatus, a method for controlling the apparatus, and a memory medium storing a control program for carrying out the method. More particularly, the invention relates to a printing apparatus which moves from a resting state to a printable state by starting image forming means every time image information has been received, a method for controlling such an apparatus, and a memory medium storing a control program for carrying out the method.

2. Description of the Related Art

In laser-beam printers which execute printing based on image data transmitted from a host computer (an external apparatus), a printer engine (image forming means) is started upon completion of reception of all image data relating to a page to be printed, thereby starting rotation of a scanner, heating of a heater, conveyance of a recording sheet to a position to start printing, and the like. After each of these operations has reached a predetermined condition, and it has become possible to perform a scanning operation by a laser beam, formation of an image to be output is started.

The above-described method has a disadvantage in that, although reception of image data may have been completed and transmission of a video signal to the printer engine can be started, printing cannot be started until the start of the printer engine is completed. That is, in the above-described method, a time obtained by adding a time to transmit image data and a time to start the printer engine is required until printing is started after starting the transmission of image data from the host computer to the printer.

In laser-beam printers which execute printing based on compressed image data (hereinafter abbreviated as "compressed data")transmitted from a host computer (an external apparatus), a printer engine (image forming means) is started upon completion of reception of all compressed data for a page to be printed, thereby starting rotation of a scanner, heating of a heater, conveyance of a recording sheet to a position to start printing, and the like.

This method has a disadvantage in that, although reception of the compressed data may have been completed and transmission of a video signal to the printer engine can be started, printing cannot be started until the start of the printer engine is completed. That is, in the above-described method, a time obtained by adding a time to transmit the compressed data and a time to start the printer engine is required until printing is started after starting the transmission of the compressed data from the host computer to the printer.

SUMMARY OF THE INVENTION

It is an object of the present invention to overcome the above-described disadvantages.

It is another object of the present invention to shorten a time required until printing is started.

According to one aspect of the present invention, these objectives may be achieved by providing a printing apparatus including reception means for receiving image information supplied from an external apparatus, image forming means for forming an image corresponding to the received image information on a recording medium, transfer-rate confirmation means for confirming a transfer rate of the image information transferred from the external apparatus, and starting means for determining a timing to start the image forming means before completion of reception of a group of image information by the reception means, based on the transfer rate of the image information, and for starting the image forming means at the determined timing.

In this printing apparatus, the transfer rate of the image information is preferably confirmed based on an amount of dummy data transferred from the external apparatus and a time required for the transfer.

The printing apparatus of the present invention preferably further includes transfer-time confirmation means for confirming a transfer time of the image information transferred from the external apparatus based on the transfer rate of the image information. The starting means preferably determines the timing to start the image forming means based on a relationship between a starting time required for shifting the image information means from a resting state to a printable state, and on the transfer time of the image information.

In the printing apparatus, it is preferable that the starting means immediately start the image forming means when it has been determined that the starting time of the image forming means is longer than a transfer time of a group of image information.

In the printing apparatus, it is preferable that, when it has been determined that the starting time of the image forming means is shorter than the transfer time of the group of image information, the starting means starts the image forming means with a timing such that the image forming means attains a printable state at substantially the same time as when the reception of the group of image information is completed.

In the printing apparatus, it is preferable that, when it has been determined that the starting time of the image forming means is shorter than the transfer time of the group of image information, the starting means starts the image forming means after a transfer time of remaining image information in the group of image information becomes substantially the same as the starting time of the image forming means, in accordance with the reception of the image information by the reception means.

In the printing apparatus, it is preferable that the image forming means form an image on a recording medium according to an electrophotographic method, and that the apparatus include a scanner for performing scanning of a beam for exposing a photosensitive drum, and that the scanner shift from a stopped state to a predetermined operating state in response to a start command from the starting means.

In the printing apparatus, the image information received by the reception means is preferably image data.

According to another aspect of the present invention, the above-noted objectives are achieved by providing a method for controlling a printing apparatus, where the apparatus includes reception means for receiving image information supplied from an external apparatus, and image forming means for forming an image corresponding to the received image information on a recording medium. The method includes the steps of confirming a transfer rate of the image information transferred from the external apparatus; determining a timing for starting the image forming means before completion of reception of a group of image information by the reception means based on the transfer rate of the image information; and starting the image forming means in accordance with the determined timing.

According to still another aspect of the present invention, the above-described objectives are achieved by providing a memory medium storing a control program for a printing apparatus, where the apparatus includes reception means for receiving image information supplied from an external apparatus and image forming means for forming an image corresponding to the received image information on a recording medium. The control program causes the apparatus to operate as a printing apparatus which includes transfer-rate confirmation means for confirming a transfer rate of the image information transferred from the external apparatus and starting means for determining a timing for starting the image forming means based on the transfer rate of the image information; the starting means starts the image forming means at the determined timing, and performs control so that the image forming means starts before completion of reception of a group of image information by the reception means.

Another aspect of the present invention relates to a printing apparatus including reception means for receiving image information supplied from an external apparatus, image a forming means for forming an image corresponding to the received image information on a recording medium, and starting means for starting the image forming means before completion of reception of a group of image information by the reception means.

In this printing apparatus, the starting means preferably starts the image forming means after the reception of the group of image information by the reception means has been started and before the reception of the image information is completed.

Furthermore, in the printing apparatus, the starting means preferably starts the image forming means immediately after the reception of the group of image information by the reception means has been started.

The printing apparatus preferably further includes stop means for causing the image forming means to enter a resting state if the reception of the group of image information by the reception means is not completed when the image forming means has arrived at a printable state, and restarting means for restarting the image forming means stopped by the stop means before the reception of the group of image information by the reception means is completed.

In the printing apparatus, it is preferable that the restarting means immediately restart the image forming means when a time to receive remaining image information is shorter than a starting time required for shifting the image forming means from the resting state to the printable state, and that the restarting means restart the image forming means after the lapse of a time equal to a difference between the reception time of the remaining image information and the starting time of the image forming means when the reception time is longer than the starting time.

In the printing apparatus, the restarting means preferably calculates the reception time of the remaining image information based on an amount of data of received image information, an amount of data of the remaining image information, and the starting time of the image forming means.

The printing apparatus preferably further includes comparison means for comparing a time to receive remaining image information with a starting time required for shifting the image forming means from a resting state to a printable state, when the reception of the group of image information by the reception means is not completed when the image forming means has arrived at the printable state; stop means for causing the image forming means to enter the resting state when the reception time of the remaining image information is longer than the starting time of the image forming means; and restarting means for restarting the image forming means stopped by the stop means, before the reception of the group of image information by the reception means is completed.

In the printing apparatus, the restarting means preferably restarts the image forming means after the lapse of a time equal to a difference between the reception time of the remaining image information and the starting time of the image forming means.

The printing apparatus preferably further includes printing instruction means for instructing the image forming means to start printing after the reception of the group of image information by the reception means has been completed and when the image forming means has arrived at a printable state.

In the printing apparatus, it is preferable that the image forming means form an image on a recording medium according to an electrophotographic method, that the image forming means include a scanner for performing scanning of a beam for exposing a photosensitive drum, and that the scanner shift from a stopped state to a predetermined operating state in response to a start command from the starting means.

In the printing apparatus, the image information received by the reception means is preferably compressed data.

A further aspect of the present invention relates to a method for controlling a printing apparatus. The method includes the steps of receiving image information supplied from an external apparatus; forming an image corresponding to the received image information on a recording medium; and starting the image forming step before completion of reception of a group of image information in the receiving step.

Still another aspect of the present invention relates to a memory medium storing a control program for a printing apparatus, where the apparatus includes reception means for receiving image information supplied from an external apparatus and image forming means for forming an image corresponding to the received image information on a recording medium. The program stored in the memory medium causes the apparatus to operate as a printing apparatus including starting means for starting the image forming means before completion of reception of a group of image information by the reception means.

The foregoing and other objects, advantages and features of the present invention will become more apparent from the following description of the preferred embodiments, particularly when considered in conjunction with the accompanying drawings.

DESCRIPTION OF THE PREFERRED EMBODIMENTS

Preferred embodiments of the present invention will now be described with reference to the drawings. In the following embodiments, the present invention is applied to a laser-beam printer. However, the present invention is not limited to a laser-beam printer, but may also be applied to a printer of any other type.

First Embodiment

Figure 1:
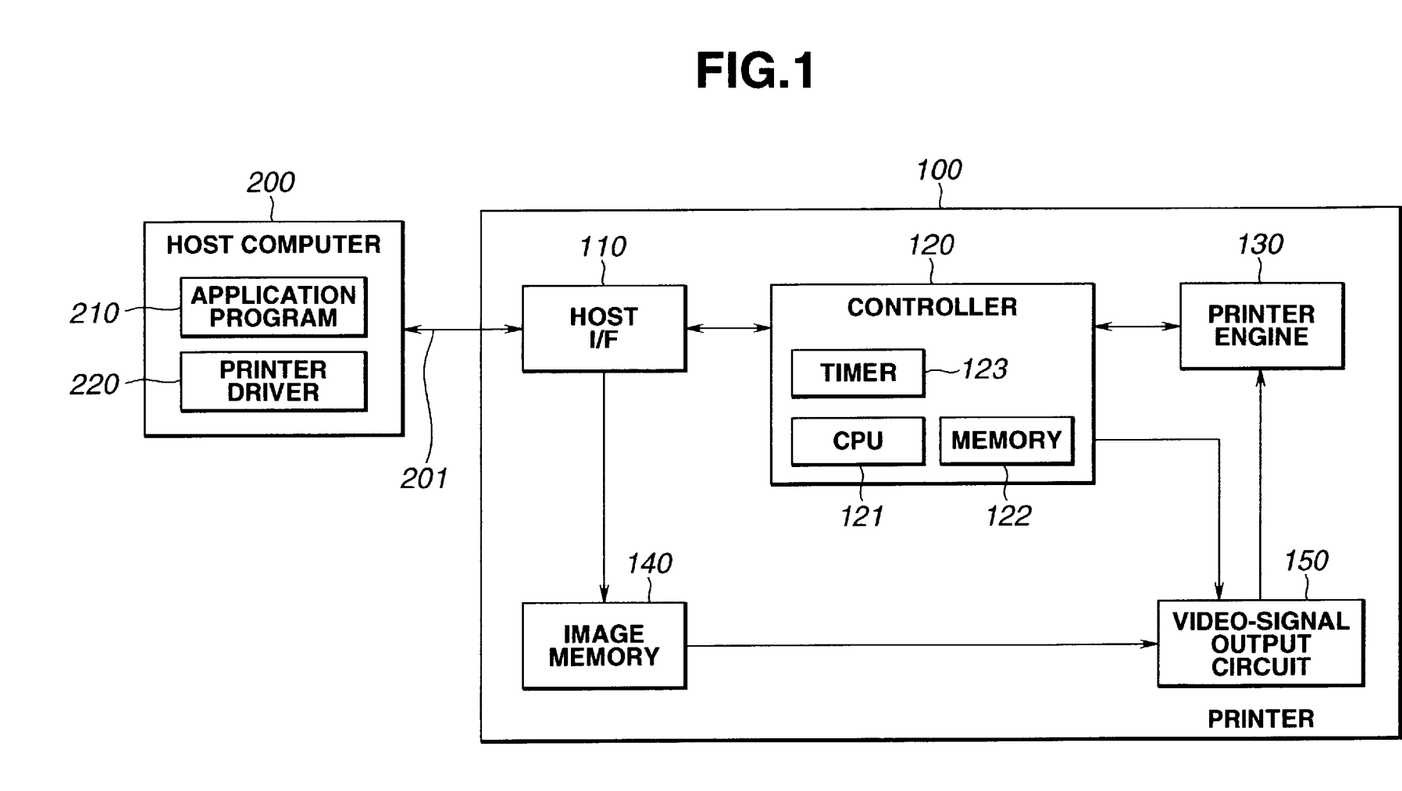
FIG. 1 is a schematic block diagram illustrating the configuration of a laser-beam printer according to a first preferred embodiment of the present invention.

FIG. 1 is a schematic block diagram illustrating the configuration of a laser-beam printer according to a first preferred embodiment of the present invention.

In FIG. 1, a laser-beam printer 100 includes a host interface 110 for communicating with a host computer 200, a controller 120 for controlling respective devices within the printer, a printer engine 130, an image memory 140 for sequentially storing image data received through the host interface 110, and a video-signal output circuit 150 for transmitting a video signal to the printer engine 130 based on the image data stored in the image memory 140.

The controller 120 incorporates a CPU (central processing unit) 121, a memory 122 storing a control program, and a timer 123. The operation of the controller 120 is defined by the control program. The timer 123 can measure a time.

The image memory 140 has a capacity sufficient to store image data for one page. The video-signal output circuit 150 continuously reads image data for the page stored in the image memory 140, generates a video signal based on the image data, and transmits the video signal to the printer engine 130 in synchronization with the operation of the printer engine 130.

In the printer 100, it is assumed that the longest time is required for bringing the rotational speed of a scanner up to a predetermined speed when shifting the printer engine 130 from a resting state to a printable state (that is, a state in which printing can be performed). It is also assumed that other tasks, such as heating of a heater of a fixing unit, conveyance of a recording sheet, and the like, are not factors in retarding the start of printing if these items are initiated when starting the video-signal output circuit 150.

Figure 2:
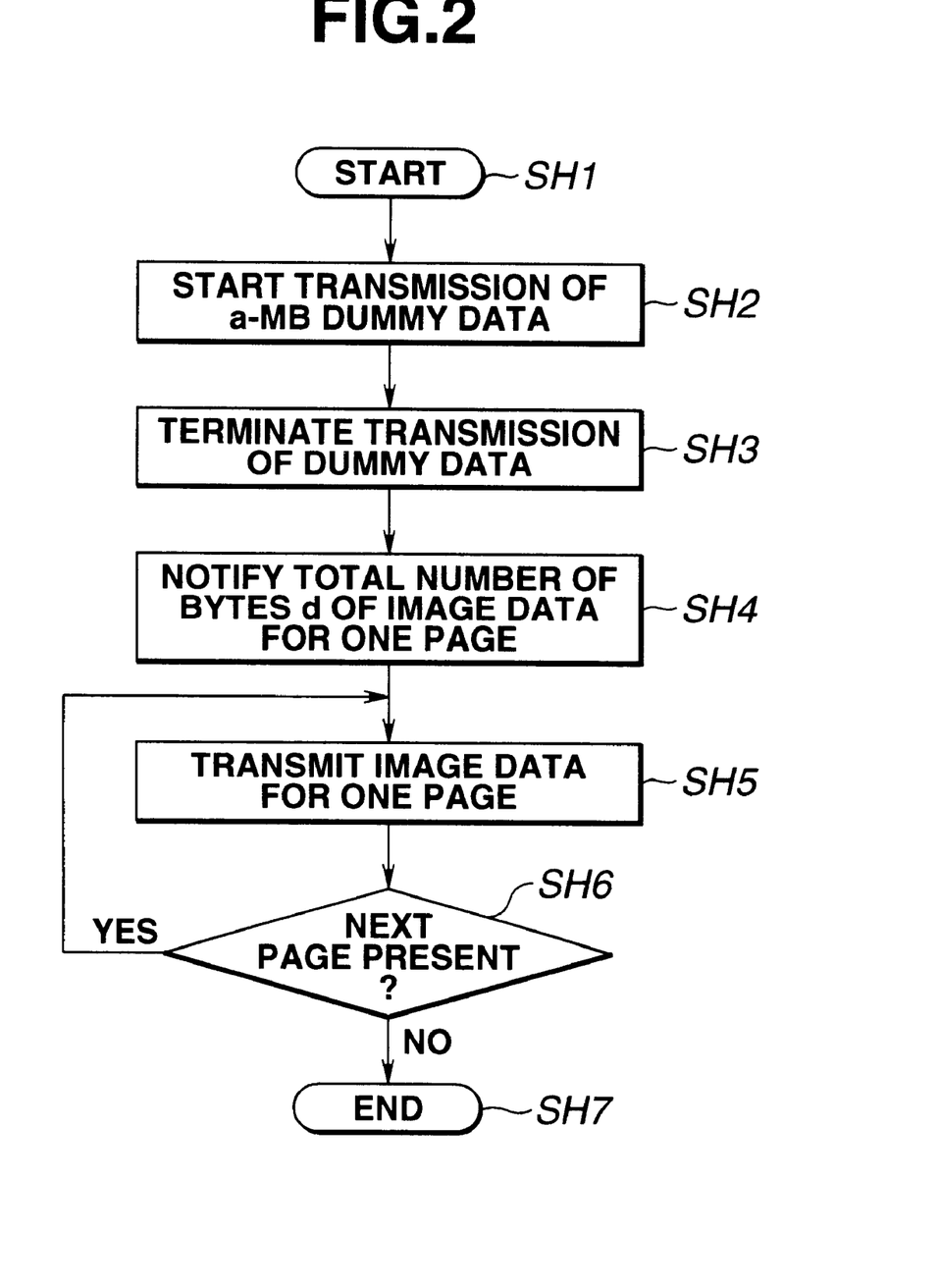
FIG. 2 is a flowchart illustrating the operation of the host computer shown in FIG. 1.
Figure 3:
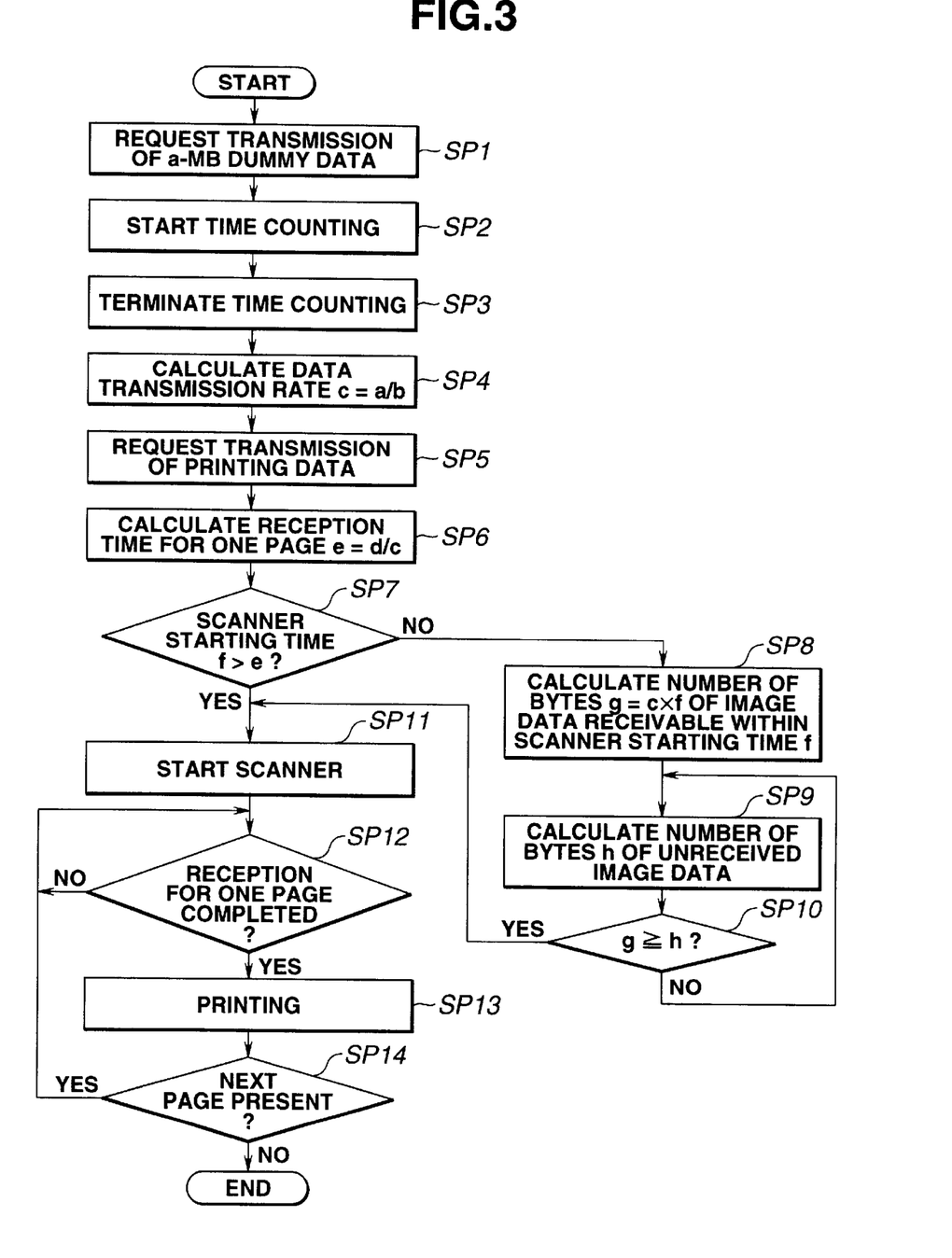
FIG. 3 is a flowchart illustrating the operation of the printer shown in FIG. 1.

FIG. 2 is a flowchart illustrating the operation of the host computer 200. FIG. 3 is a flowchart illustrating the operation of the printer 100. The operation of the printer system shown in FIG. 1 will now be described with reference to FIGS. 2 and 3.

The operation of the host computer 200 is controlled by a printer driver 220, and the operation of the printer 100 is controlled by the CPU 121 (in the controller 120) based on the control program stored in the memory 122.

The processing sequence shown in these flowcharts is started in the host computer 200, for example, by starting the printer driver 220 according to an application program 210, to instruct execution of printing.

In step SH1, the host computer 200 notifies the printer 100 of the start of printing via an interface 201. In response to this notification, the printer 100 requests, in step SP1, the host computer 200 to transmit dummy data having a predetermined amount "a" (MB (bytes)) via the interface 201.

In response to this request, the host computer 200 starts, in step SH2, the operation of transmitting the a-MB dummy data to the printer 100 via the interface 201. Since this dummy data is data for measuring the transfer rate of data between the host computer 200 and the printer 100 via the interface 201, it may have any content. However, it is preferable to add a control code or the like indicating that the succeeding data is dummy data at the head of the dummy data.

In step SP2, when the printer 100 has recognized that the data transmitted from the host computer 200 is dummy data, the printer 100 starts a time counting operation by starting the timer 123 within the controller 120.

In step SH3, the host computer 200 monitors whether the transmission of the a-MB dummy data has been completed, and stops the transmission of the dummy data upon completion of the transmission of data of "a" MB. By adding, for example, a control code or the like indicating that the transmission of the dummy data is terminated at the end of the dummy data, the host computer 200 notifies the printer 100 of completion of the transmission of the dummy data.

In response to this notification, the printer 100 terminates the time counting in step SP3, and calculates the transfer time of the a-MB dummy data based on the count value. The transfer time is represented by b (sec).

Then, in step SP4, the printer 100 calculates the data transfer rate c (MB/sec)=a/b between the host computer 200 and the printer 100.

Then, in step SP5, the printer 100 requests the host computer 200 to transmit image data to be printed.

In response to this request, the host computer 200 transmits image data to be printed, i.e., image data (printing data) relating to a printing job requested from the application program 210, to the printer 100.

More specifically, in step SH4, the host computer 200 notifies the printer 100 of the total number of bytes (MB) d of image data (printing data) for the first page relating to the printing job. Although a description is provided in the first embodiment assuming that the printing data is image data, the printing data may be transmitted to the printer 100 in a compressed form. The total number of bytes d is, of course, the total number of bytes in the form of data actually transmitted from the host computer 200 to the printer 100 (for example, the total number of bytes of compressed data when transmitting compressed data).

Then, in step SH5, the host computer 200 transmits image data for one page relating to the printing job to the printer 100 via the interface 201.

In step SH6, the host computer 200 determines whether a printing job for the next page is present. If the result of the determination in step SH6 is affirmative, the process returns to step SH5 in synchronization with the operation of the printer 100 (i.e., waiting for printing of image data for the preceding page to be completed and for image data for the next page can be received), and the same processing is repeated.

Upon reception of the notification of the total number of bytes d (MB), the printer 100 calculates, in step SP6, the transfer time (reception time) e (sec)=d/c of the image data for the first page relating to the printing job from the total number of bytes d (MB) and the data transfer rate c (MB/sec).

Then, in step SP7, the printer 100 compares a time f (sec) required for bringing the scanner of the printer engine 130 from a resting state to a predetermined speed (hereinafter termed a "scanner starting time")with the transfer time e (sec) of the image data.

If it has been determined in step SP7 that the scanner starting time f is longer than the image-data transfer time e, the process immediately proceeds to step SP11, where the scanner is started. In this case, when the rotation speed of the scanner reaches the predetermined speed, the reception of the image data from the host computer 200 has already been completed. In other words, when the reception of the image data is completed, the rotation speed of the scanner has already reached the predetermined speed, to provide a printable state. Accordingly, printing can be immediately started upon completion of the reception of the image data.

More specifically, after the host computer 200 has started processing relating to printing (step SH1), printing is started after the lapse of the scanner starting time f after the controller 120 of the printer 100 has started the scanner of the printer engine 130 (step SP11). As a result, printing is started earlier than if the scanner is started upon completion of the reception of the image data; the time savings is (e−b) (sec).

When it has been determined in step SP7 that the scanner starting time f is not larger than the image-data transfer time e, the printer 100 calculates, in step SP8, the number of bytes g (MB)=c×f of image data receivable from the host computer 100 during the scanner starting time f.

Then, in step SP9, the printer 100 confirms the number of bytes i (MB) of image data received up to the present from the start of the reception of image data, and calculates the number of bytes h (MB)=d−i of unreceived image data for the leading page by subtracting the number of bytes from the total number of bytes d of image data. The number of bytes i of received image data can be confirmed, for example, by providing a counter for counting the number of bytes of image data transferred to the image memory 140 in the host interface 110.

Then, in step SP10, the printer 100 compares the number of bytes g of image data receivable during the scanner starting time f with the number of bytes h of unreceived image data. When it has been determined in step SP10 that the number of bytes g≧the number of bytes h, i.e., when it has been determined that the reception of image data for the leading page will be completed before the scanner reaches the predetermined rotation speed to provide a printable state, the process proceeds to step SP11 where the scanner is started.

On the other hand, when it has been determined in step SP10 that the number or bytes g<the number of bytes h, i.e., when it has been determined that the reception of image data for the leading page will not be completed before the scanner reaches the predetermined rotation speed when the scanner is assumed to be immediately started, the process returns to step SP9.

That is, after waiting in steps SP9 and SP10 while the reception of the image data from the host computer 200 continues and the relationship of the number of bytes g≧the number of bytes h is satisfied, the process proceeds to step SP11, where the scanner is started.

By performing such a control procedure, it is possible to start the scanner at a time earlier than the time of completion of the reception of the image data from the host computer 200 by the scanner starting time f (in the first embodiment, the time from the resting state to the printable state of the printer engine 130). As a result, it is possible to start printing immediately after completion of the reception of the image data for the leading page, and to prevent unnecessary operation of the scanner.

More specifically, the time to start printing can be earlier than in an approach of starting the scanner after completion of the reception of the image data by (f−b) (sec).

After starting the scanner in step SP11, the printer 100 determines in step SP12 whether the reception of the image data for one page has been completed. If the result of the determination in step SP12 is affirmative, the process proceeds to step SP13 where printing is executed based on the received image data, i.e., the image data for one page stored in the image memory 140.

Then, in step SP14, the printer 100 determines whether printing of the next page is requested. If the result of the determination in step SP14 is affirmative, the process returns to step SP12. If the result of the determination in step SP14 is negative, i.e., when printing of all pages relating to the printing request (including the case of only one page) has been completed, the process is terminated.

As described above, by confirming the transfer rate of data from the host computer 200 to the printer 100 by transferring dummy data, estimating the time required for receiving unreceived image data based on the transfer rate, and controlling the timing to start the scanner so that the rotation speed of the scanner reaches a predetermined speed substantially simultaneously with the reception of image data based on the estimation, it is possible to start printing promptly after the reception of the image data.

The first embodiment relates to a case in which the scanner starting time f is the factor that limits the start of printing. When any other item (for example, the heating time of the heater, the conveying time of the recording sheet, or the like) is also a factor delaying the start of printing, the above-described control process may also be applied to that item. For example, when the item is the heating time of the heater, the scanner starting time in the foregoing description may be replaced by the heating time of the heater, and heating of the heater may be started in step SP11. When the item is the conveying time of the recording sheet, for example, the conveyance of the recording sheet may be started immediately after receiving the image data.

Although the first embodiment relates to the case of receiving image data from the host computer, the image data may be image information of any other type. When a considerable time is required for generating image data based on the received image information, it is preferable to perform the above-described control process in consideration of that time.

Second Embodiment

Figure 4:
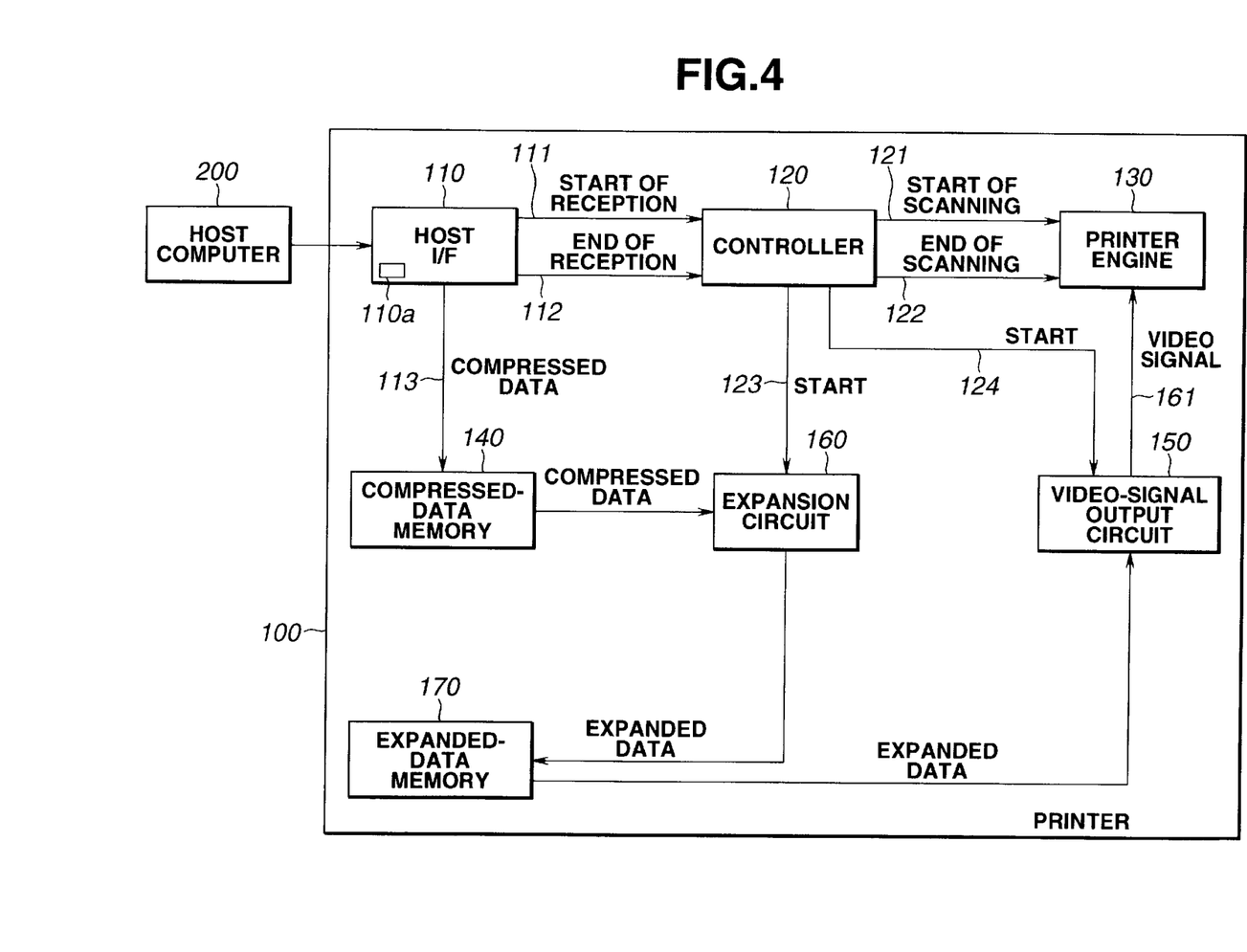
FIG. 4 is a schematic block diagram illustrating the configuration of a laser-beam printer according to a second preferred embodiment of the present invention.

FIG. 4 is a schematic block diagram illustrating the configuration of a laser-beam printer according to a second preferred embodiment of the present invention. In FIG. 4, components corresponding to those in the first embodiment (see FIG. 1) are indicated by the same reference numerals.

In FIG. 4, a laser-beam printer 100 includes a host interface 110 for communicating with a host computer 200, a controller 120 for controlling respective devices within the printer, a printer engine 130, a compressed-data memory (image memory) 140 for storing received compressed data, an expansion circuit 160 for expanding the compressed data, a video-signal output circuit 150 for transmitting a video signal to the printer engine 130 based on expanded image data (hereinafter abbreviated as "expanded data"), and expanded-data memory 170 for storing the expanded data.

When the reception of compressed data transmitted from the host computer 200 is started, the host interface 110 transmits a reception-start signal to controller 120 via a signal line 111, and transmits a reception-end signal upon completion of the reception to the controller 120 via a signal line 112. According to these reception-start and reception-end signals, the controller 120 can recognize the start and the end of the reception of the compressed data. The host interface 110 can generate the reception-start signal and the reception-end signal, for example, by controlling the logic levels of the signal lines 111 and 112 by software.

The compressed data received by the host interface 110 is temporarily stored in the compressed-data memory 140 via a signal line 113. The compressed-data memory 140 has, for example, a capacity to store compressed data for one page.

The controller 120 incorporates, for example, a CPU, a memory storing a control program, and a timer. The operation of the controller 120 is defined by the control program. The timer can measure a time. The controller 120 controls the printer engine 130, the expansion circuit 160, the video-signal output circuit 150 and other devices (not shown) based on the reception-start signal, the reception-end signal and other control signals.

More specifically, the controller 120 transfers a scanning start command for initiating the rotation of a scanner for performing scanning of a laser beam on a photosensitive drum or a scanning stop command for stopping the rotation of the scanner to the printer engine 130 via a signal line 121 or 122, respectively. The controller 120 also transfers commands for heating a fixing unit, conveying a recording sheet, or the like to the printer engine 130 via a signal line (not shown).

The controller 120 also transfers a start command for starting expansion of the compressed data stored in the compressed-data memory 140 to the expansion circuit 160 via a signal line 123. The controller 120 also transfers a start command to the video-signal output circuit 150 via a signal line 124, causing the video-signal output circuit 150 to read the expanded data sequentially stored in the expanded-data memory 170 from the expansion circuit 160, generate a video signal based on the expanded data, and transmit the video signal to the printer engine 130.

In response to the instruction from the controller 120, the expansion circuit 160 continuously reads compressed data for one page temporarily stored in the compressed-data memory 140, sequentially expands the compressed data in accordance with a predetermined expansion algorithm, and temporarily stores the expanded data in the expanded-data memory 170 which operates as a buffer storage for the expanded data.

In response to the instruction from the controller 120, the video-signal output circuit 150 continuously reads the expanded data sequentially stored in the expanded-data memory 170, generates a video signal based on the expanded data, and transmits the video signal to the printer engine 130 in synchronization with the operation of the printer engine 130.

In the printer 100, it is assumed that the greatest delay in shifting the printer engine 130 from a resting state to a printable state is in bringing the rotational speed of the scanner to a predetermined speed. It is also assumed that other items, such as heating of the heater of the fixing unit, conveyance of the recording sheet, and the like, are not factors in delaying the start of printing if signals for starting these items are transmitted when starting the video-signal output circuit 150.

Figure 5:
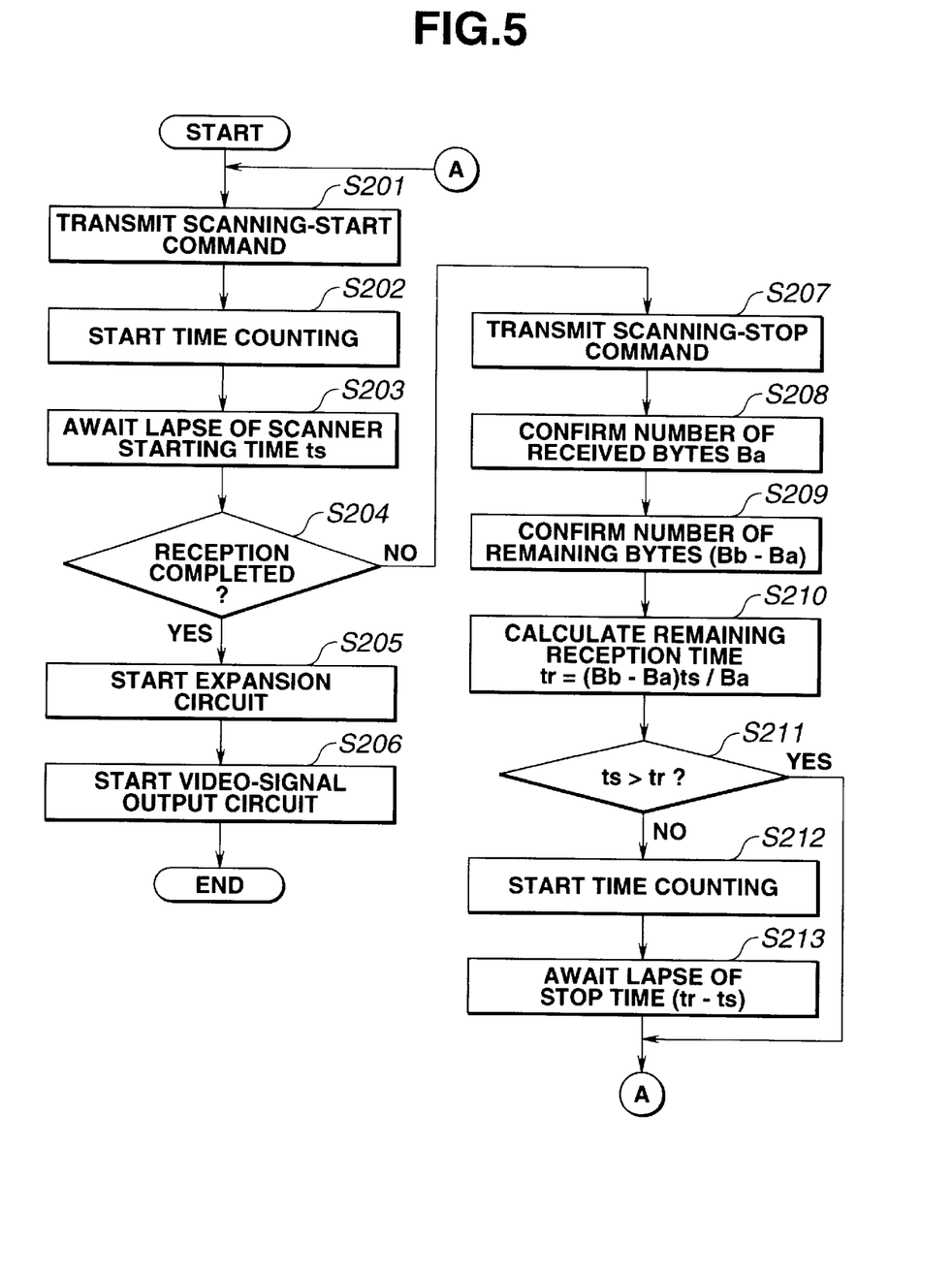
FIG. 5 is a flowchart illustrating the process of controlling a printer by the controller shown in FIG. 4.

FIG. 5 is a flowchart illustrating the operation of controlling the printer 100 by the controller 120. The control process shown in this flowchart is based on a control program stored in a memory mediumn (not shown) within the controller 120. The memory medium itself, storing the control program, embodies an additional aspect of the present, invention.

The process shown in the flowchart of FIG. 5 is started by receiving a reception start signal from the host interface 110. First, in step S201, a scanning-start command is transmitted to the printer engine 130 in order to start the rotation of the scanner. As noted above, it is this component of the printer engine 130 which requires the longest time for shifting to a printable state.

A scanner starting time, defined as the time required until the scanner is rotating at a predetermined rotation speed, is represented by ts (sec). As has been previously assumed, in the printer 1001 the scanner starting time ts coincides with the time required for the printer engine to shift to the printable state.

In step S202, the controller 120 starts an operation of counting time using the timer incorporated in the controller. In step S203, the process waits until the timer counts the scanner starting time ts.

In step S204, it is determined whether the reception of the compressed data by the host interface 110 has been completed based on the reception-end signal. If the result of the determination in step S204 is affirmative, the process proceeds to step S205, where a start command is transmitted to the expansion circuit 160. In response to the start command, the expansion circuit 160 continuously reads compressed data for one page stored in the compressed-data memory 140, sequentially expands the compressed data, and sequentially stores expanded data into the expanded-data memory 170.

In step S206, the controller 120 starts the video-signal output circuit 150. In addition, commands for initiating heating of the heater of the fixing unit, conveyance of the recording sheet, and the like are transmitted to the printer engine 130.

Thus, the video-signal output circuit 150 continuously reads the expanded data sequentially stored in the expanded-data memory 170, generates a video signal based on the expanded data, and transmits the video signal to the printer engine 130 via a signal line 161.

The printer engine 130 drives a laser based on the transmitted video signal, and forms a latent image on a photosensitive drum by performing scanning of the laser beam using the scanner. After passing through a developing process, a transfer process and a fixing process, the recording sheet having an output image formed thereon is discharged.

If the result of the determination in step S204 is negative, i.e., when the transfer time of the compressed data is longer than the scanner starting time ts, the process proceeds to step S207.

In step S207, the controller 120 transmits a scanning stop command to the printer engine 130. The rotation of the scanner (which has reached the predetermined rotation speed) is thereby stopped. The rotation of the scanner is stopped in order to avoid unnecessary electric power consumption and to increase the life of the scanner. In order to prevent the rotation of the scanner being stopped (and the start of printing thereby being delayed) due to a slight delay in the transfer of the compressed data, it is preferable to set a time longer than the actual scanner starting time (that is, adding a margin) for the scanner starting time ts.

In step S208, the number of bytes Ba of compressed data received within the scanner starting time ts is confirmed. In the second embodiment, a counter 110a for counting the number of bytes of compressed data transferred from the host interface 110 to the compressed-data memory 170 is provided in the host interface 110. By referring to this counter, the number of bytes of received compressed data can be confirmed.

In step S209, the controller 120 confirms the total number of bytes Bb of compressed data being received. Such confirmation may be performed, for example, using a method of adding information indicating the total number of bytes to the compressed data transmitted from the host computer 200 (for example, at the head of the compressed data) and referring to this information.

In step S210, a time required for receiving remaining compressed data (that is, a remaining reception time) tr= (Bb−Ba)·ts/Ba is calculated based on the number of bytes Ba received within the scanner starting time ts, the total number of bytes Bb of compressed data, and the scanner starting time ts.

In step S211, the scanner starting time ts is compared with the remaining reception time tr. When the scanner starting time ts is not larger than the remaining reception time tr, the process proceeds to steps S212 and S213 in order to prevent unnecessary rotation/stop operations of the scanner. Then, the process returns to step S201.

In step S212, the controller 120 starts time counting using the timer incorporated in the controller. In step S213, the process waits for the lapse of a stop time (tr−ts) which is a time to stop the scanner. Then, the process returns to step S201. By thus awaiting the lapse of the stop time, it is possible to start the rotation of the scanner earlier than completion of the reception of the compressed data by the scanner starting time ts. As a result, by awaiting the lapse of the scanner starting time ts. in step S203, the reception of the compressed data is completed at the same time that the rotation speed of the scanner reaches the predetermined speed. Then, the expansion circuit 160 can be immediately started (step S205).

When the scanner starting time ts is larger than the remaining reception time tr in step S211, the process returns directly to step S201, and the rotation of the scanner is immediately started. In this case, the rotation speed of the scanner reaches the predetermined speed after the reception of the compressed data has been completed, and printing can be started more promptly than in a process where the scanner is rotated after awaiting completion of the reception of the compressed data.

According to the printer of the second embodiment described above, it is possible to promptly start printing after completing the reception of image information (compressed data), since preparation of the printer engine is started before completing the reception of image information.

Third Embodiment

In a third embodiment of the present invention, printing is started more promptly by avoiding unnecessary stopping of a scanner which has reached a predetermined rotation speed. A description will now be provided of a difference between the third embodiment and the second embodiment. Items which are not described conform to the second embodiment.

Figure 6:
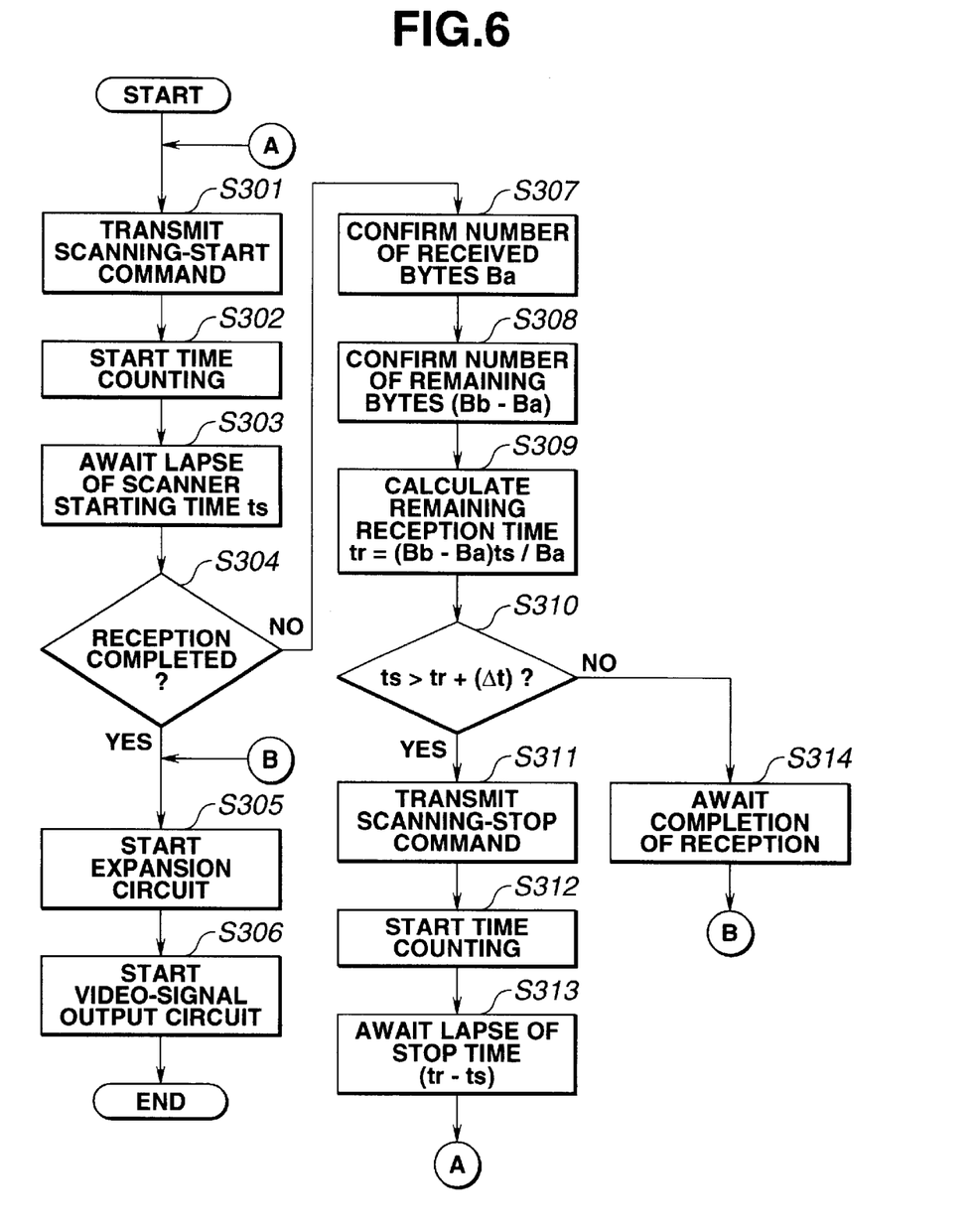
FIG. 6 is a flowchart illustrating the process of controlling a printer by a controller according to a third preferred embodiment of the present invention.

FIG. 6 is a flowchart illustrating the operation of controlling the printer 100 by the controller 120 in the third embodiment. Processing in steps S301–S306 is identical to the processing in steps S201–S206 in the second embodiment, and processing in steps S307–S309 is identical to the processing in steps S208–S210 in the second embodiment. Hence, further description thereof will be omitted.

In the third embodiment, if it is determined in step S304 that reception of the compressed data is not completed, a scanning stop command is not immediately transmitted. Instead, a scanning stop command is transmitted only when the scanner starting time ts is larger than the remaining reception time, i.e., when no delay will occur in starting printing even if the rotation of the scanner is stopped.

More specifically, in step S310, the scanner starting time ts is compared with the remaining reception time tr (or a time obtained by adding a predetermined margin Δt to tr). Only when the scanner starting time ts is longer, does the process proceed to step S311, where a scanner stop command is transmitted to stop the rotation of the scanner.

Then, in step S312, the controller 120 starts time counting using the timer incorporated in the controller. In step S313, the process waits for the lapse of a stop time (tr−ts) which is a time to stop the scanner. Then, the process returns to step S301. By thus awaiting the lapse of the stop time, it is possible to start the rotation of the scanner earlier than completion of the reception of the compressed data by the scanner starting time ts. As a result, by awaiting the lapse of the scanner starting time ts in step S303, the reception of the compressed data is completed at the same time that the rotation speed of the scanner reaches the predetermined speed. Then, the expansion circuit 160 can be immediately started (step S305).

When the scanner starting time ts is not larger than the remaining reception time tr (or a time obtained by adding a predetermined margin Δt to tr), a scanning stop command is not transmitted. In step S314, completion of the reception of the compressed data is awaited, and the process then returns to step S305. It is thereby possible to avoid stopping the rotation of the scanner, although the scanner starting time ts is smaller than the remaining reception time tr.

As a result, according to the third embodiment, it is possible to always start the expansion circuit (step S305) immediately after completion of the reception of the compressed data; this in turn assures a prompt start of printing.

The above-described second and third embodiments relate to a case in which the scanner starting time ts is the limiting factor in starting printing. When any other item (for example, the heating time of the heater, the conveying time of the recording sheet, or the like) is also a factor which retards the start of printing, the above-described control process may also be applied to that item. For example, when the item is the heating time of the heater, the scanner start command and the scanner stop command in the foregoing description may be replaced by a heating start command and a heating stop command for the heater, respectively. When the item is the conveying time of the recording sheet, for example, the conveyance of the recording sheet may be started immediately after receiving the compressed data.

Although the second and third embodiments relate to the case of receiving compressed data from the host computer, the compressed data may be image information of any other type. In such a case, for example, the expansion circuit is replaced by a developing circuit (rasterizer) or the like.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system or an apparatus with a storage medium storing software for realizing the functions of the above-described embodiments, and reading and executing the software stored in the storage medium by means of a computer (or a CPU or an MPU (microprocessor unit)) of the system or the apparatus.

In such a case, the program code read from the storage medium realizes the functions of the above-described embodiments, so that the storage medium storing the program code itself represents an embodiment the present invention.

For example, a floppy disk, a hard disk, an optical disk, a magnetooptical disk, a CD(compact disk)-ROM(read-only memory), a CD-R (recordable), a magnetic tape, a nonvolatile memory card, a ROM or the like may be used as the storage medium for supplying the program code.

The present invention may be applied not only to a case in which the functions of the above-described embodiments are realized by executing software (program code) read by a computer, but also to a case in which an OS (operating system) or the like operating in a computer executes a part or all of the actual processing, and the functions of the above-described embodiments are thereby realized.

The present invention may also be applied to a case in which, after writing program code read from a storage medium into a memory provided in a function expanding card inserted into a computer or in a function expanding unit connected to the computer, a CPU or the like provided in the function expanding card or function expanding unit performs a part or all of the actual processing, and the functions of the above-described embodiments are thereby realized.

According to the present invention, it is possible to shorten the time required until printing is started, and, as a result, to realize high-speed output.

The individual components shown in outline or designated by blocks in the drawings are all well-known in the printing apparatus and memory medium arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus comprising:
   reception means for receiving image information supplied from an external apparatus;
   image forming means for forming an image corresponding to the received image information on a recording medium;
   transfer-rate confirmation means for confirming a transfer rate of the image information transferred from the external apparatus; and
   starting means for determining a timing to start said image forming means before completion of reception of a group of image information by said reception means, based on a transfer time of the image data calculated by using the transfer rate of the image information, and starting said image forming means at the determined timing.

2. A printing apparatus according to claim 1, wherein the transfer rate of the image information is confirmed based on an amount of dummy data transferred from the external apparatus and a time required for transfer of the image information.

3. A printing apparatus comprising:
   reception means for receiving image information supplied from an external apparatus;
   image forming means for forming an image corresponding to the received image information on a recording medium;
   transfer-rate confirmation means for confirming a transfer rate of the image information transferred from the external apparatus:
   starting means for determining a timing to start said image forming means before completion of reception of a group of image information by said reception means, based on the transfer rate of the image information, and starting said image forming means at the determined timing; and
   transfer-time confirmation means for confirming a transfer time of the image information transferred from the external apparatus based on the transfer rate of the image information,
   wherein said starting means determines the timing to start said image forming means based on a relationship between a starting time required for shifting said image information means from a resting state to a printable state and the transfer time of the image information.

4. A printing apparatus according to claim 3, wherein said starting means immediately starts said image forming means when it is determined that the starting time is longer than a transfer time of a group of image information.

5. A printing apparatus according to claim 3, wherein when it is determined that the starting time is shorter than the transfer time of the group of image information, said starting means starts said image forming means with a timing such that said image forming means shifts to the printable state substantially simultaneously with completion of reception of the group of image information.

6. A printing apparatus according to claim 5, wherein when it is determined that the starting time is shorter than the transfer time of the group of image information, said starting means starts said image forming means after a transfer time of remaining image information in the group of image information becomes substantially as short as the starting time in accordance with reception of the image information by said reception means.

7. A printing apparatus according to claim 1, wherein said image forming means forms an image on the recording medium according to an electrophotographic method and comprises a scanner for scanning a beam to expose a photosensitive drum, and wherein said scanner shifts from a stopped state to a predetermined operating state in response to a start command from said starting means.

8. A printing apparatus according to claim 1, wherein the image information received by said reception means comprises image data.

9. A method for controlling a printing apparatus including reception means for receiving image information supplied from an external apparatus and image forming means for forming an image corresponding to the received image information on a recording medium, said method comprising the steps of:
   confirming a transfer rate of the image information transferred from the external apparatus;
   determining a timing to start the image forming means before completion of reception of a group of image information by the reception means, based on a transfer time of the image data calculated by using the transfer rate of the image information; and
   starting the image forming means at the determined timing.

10. A memory medium storing a control program for a printing apparatus comprising reception means for receiving image information supplied from an external apparatus and image forming means for forming an image corresponding to the received image information on a recording medium, execution of said control program causing said printing apparatus to operate as a printing apparatus which comprises:
   transfer-rate confirmation means for confirming a transfer rate of the image information transferred from the external apparatus; and
   starting means for determining a timing to start said image forming means based on a transfer time of the image data calculated by using the transfer rate of the image information and starting said image forming means at the determined timing, so that the timing is before completion of reception of a group of image information by said reception means.

11. A printing apparatus comprising:

reception means for receiving image information supplied from an external apparatus;

image forming means for forming an image corresponding to the received image information on a recording medium;

first starting means for starting a preparation operation of said image forming means before completion of reception of one page of the image information by said reception means, wherein the preparation operation shifts said image forming means from a resting state to a printable state; and second starting means for starting printing after completion of the reception of the one page of the image information by said reception means.

12. A printing apparatus according to claim 11, wherein said first starting means starts said image forming means after the reception of the one page of the image information by said reception means is started and before the reception of the image information is completed.

13. A printing apparatus according to claim 11, wherein said first starting means starts said image forming means immediately after the reception of the one page of the image information by said reception means is started.

14. A printing apparatus according to claim 11, further comprising:

stop means for causing said image forming means to enter a resting state if the reception of the one page of the image information is not completed when said image forming means has attained a printable state; and restarting means for restarting said image forming means in the resting state, before the reception of the one page of the image information is completed.

15. A printing apparatus comprising:

reception means for receiving image information supplied from an external apparatus;

image forming means for forming an image corresponding to the received image information on a recording medium;

starting means for starting said image forming means before completion of reception of a group of image information by said reception means;

stop means for causing said image forming means to enter a resting state if the reception of the group of image information is not completed when said image forming means has attained a printable state; and restarting means for restarting said image forming means in the resting state, before the reception of the group. of image information is completed, wherein said restarting means immediately restarts said image forming means when a reception time to receive remaining image information is shorter than a starting time required for shifting said image forming means from the resting state to the printable state, and restarts said image forming means after awaiting the lapse of a time equal to a difference between the reception time and the starting time when the reception time is longer than the starting time.

16. A printing apparatus according to claim 15, wherein said restarting means calculates the reception time based on an amount of data of received image information, an amount of data of the remaining image information, and the starting time.

17. A printing apparatus comprising:

reception means for receiving image information supplied from an external apparatus;

image forming means for forming an image corresponding to the received image information on a recording medium;

starting means for starting said image forming means before completion of reception of a group of image information by said reception means;

comparison means for comparing a reception time to receive remaining image information with a starting time required for shifting said image forming means from a resting state to a printable state when the reception of the group of image information by said reception means is not completed when said image forming means has attained the printable state;

stop means for causing said image forming means to enter the resting state when the reception time is longer than the starting time; and restarting means for restarting said image forming means in the resting state by said stop means, before the reception of the group of image information by said reception means is completed.

18. A printing apparatus according to claim 17, wherein said restarting means restarts said image forming means after awaiting a lapse of a time equal to a difference between the reception time and the starting time.

19. A printing apparatus according to claim 11, further comprising printing instructions means for instructing said image forming means to start printing after the reception of the one page of the image information by said reception means is completed and when said image forming means has attained a printable state.

20. A printing apparatus according to claim 11, wherein said image forming means forms an image on the recording medium according to an electrophotographic method and comprises a scanner for scanning a beam to expose a photosensitive drum, and wherein said scanner shifts from a stopped state to a predetermined operating state in response to a start command from said starting means.

21. A printing apparatus according to claim 11, wherein the image information received by said reception means comprises compressed data.

22. A method for controlling a printing apparatus, said method comprising the steps of:

receiving image information supplied from an external apparatus; and forming, with image forming means, an image corresponding to the received image information on a recording medium, wherein a preparation operation of the image forming means is started before completion of reception of one page of the image information in said receiving step, wherein said preparation operation shifts the image forming means from a resting state to a printable state, and wherein printing is started after completion of the reception of the one page of the image information.

23. A memory medium storing a control program for a printing apparatus comprising reception means for receiving image information supplied from an external apparatus and image forming means for forming an image corresponding to the received image information on a recording medium, execution of said control program causing said printing apparatus to operate as a printing apparatus comprising:

first starting means for starting a preparation operation of said image forming means before completion of reception of one page of the image information by said reception means, wherein the preparation operation shifts said image forming means from a resting state to a printable state; and second starting means for starting printing after completion of the reception of the one page of the image information by said reception means.

\* \* \* \* \*

UNITED STATES PATENT AND TRADEMARK OFFICE
CERTIFICATE OF CORRECTION

PATENT NO. : 6,297,887 B1
DATED : October 2, 2001
INVENTOR(S) : Mitsugu Yamauchi It is certified that error appears in the above-identified patent and that said Letters Patent is hereby corrected as shown below:

Title page,
Under item [56] References Cited, "5,490,237 2/1996 Zimmermman et al." should read -- 5,490,237 2/1996 Zimmerman et al. --.

Column 3,
Line 22, "a" should be deleted.

Column 6,
Line 10, "transmission." should read -- transmission --.

Column 11,
Line 20, "ts." should read -- ts --.

Column 13,
Line 61, "apparatus:" should read -- apparatus; --.

Signed and Sealed this

Twenty-sixth Day of March, 2002

Attest:

*Attesting Officer*

JAMES E. ROGAN
*Director of the United States Patent and Trademark Office*